United States Patent

Martens

[11] Patent Number: 5,838,835
[45] Date of Patent: Nov. 17, 1998

[54] BETTER CONTRAST NOISE BY RESIDUE IMAGE

[75] Inventor: Jean B. O. S. Martens, Eindhoven, Netherlands

[73] Assignee: U.S. Philips Corporation, New York, N.Y.

[21] Appl. No.: 949,647

[22] Filed: Oct. 14, 1997

Related U.S. Application Data

[63] Continuation of Ser. No. 432,756, May 2, 1995, abandoned.

[30] Foreign Application Priority Data

May 3, 1994 [EP] European Pat. Off. ............... 94201232

[51] Int. Cl.[6] ..................................................... G06K 9/40
[52] U.S. Cl. ............................................ 382/274; 382/261
[58] Field of Search ..................................... 382/260–263, 382/272–274, 254, 299

[56] References Cited

U.S. PATENT DOCUMENTS

| | | | |
|---|---|---|---|
| 4,825,297 | 4/1989 | Fuchsberger et al. | 358/284 |
| 4,887,306 | 12/1989 | Hwang et al. | 382/261 |
| 4,941,190 | 7/1990 | Joyce | 382/264 |
| 5,031,226 | 7/1991 | Delange | 382/199 |
| 5,103,311 | 4/1992 | Sluijter et al. | 558/160 |
| 5,524,070 | 6/1996 | Shin et al. | 382/263 |

FOREIGN PATENT DOCUMENTS

| | | |
|---|---|---|
| 0368162 | 5/1990 | European Pat. Off. . |
| 0527525 | 2/1993 | European Pat. Off. . |
| 3012984 | 10/1981 | Germany . |

OTHER PUBLICATIONS

"Automatic, Adaptive, Brightness Independent Contrast Enhancement", Signal Processing, vol. 21, (1990), pp. 169–182.

"Noise Reduction in Computerized Tomography Images by Means of Polynomial Transforms", Journal of Visual Comm. and Image Representation, vol. 3, Sep. 1992, pp. 272–285.

Primary Examiner—Leo H. Boudreau
Assistant Examiner—Bhavesh Mehta
Attorney, Agent, or Firm—Dwight H. Renfrew, Jr.

[57] ABSTRACT

A method for contrast-enhancing in a multi-dimensional image in image locally detects a contrast quantity. This quantity is determined to be either in a low range or in a high range. When in the high range, the contrast is locally enhanced with an enhancement factor that is a monotonic non-increasing function of the local contrast. After enhancing, the contrast itself is a monotonically increasing function of the contrast before enhancing.

9 Claims, 3 Drawing Sheets

BETTER CONTRAST NOISE BY RESIDUE IMAGE

This is a continuation of application Ser. No. 08/432,756, filed May 2, 1995, now abandoned.

BACKGROUND OF THE INVENTION

Field of the Invention

The invention relates to a method for contrast-enhancing in a multi-dimensional image. The method comprising the steps of:

sampling the image according to a regular array of instants based on said instants locally detecting a contrast quantity detecting said quantity as being either in a low range or in a high range when in said high range locally relatively enhancing said contrast with an enhancement factor that is a monotonically non-increasing, non-uniform function of said local contrast quantity.

A method of this kind has been described in F. P. de Vries, Automatic, Adaptive, Brightness Independent Contrast Enhancement, Signal Processing Vol. 21 (1990) 169–182. There, the enhancement is applied to the logarithm of the image data. Uniform windows are used, and no sub-sampling is applied. The enhancement factor is (mu+kap) if the local residue energy c(p) is lower than the variance var, and (mu+kap*var/contrast) otherwise. The meanings of these parameters will be explained hereinafter. A problem, as shown in FIG. 5, infra, is that low-contrast features that are minimally above a threshold are enhanced, whereas slightly higher contrast values are relatively obscured. In a particular region, the output contrast even decreases as the input contrast increases. This clearly leads to unwanted suppression of useful information. The present invention is based on the insight that applying the method according to the reference looses information when contrast is just above the threshold, and therefore the reference method is quite inflexible.

SUMMARY TO THE INVENTION

Amongst other things, it is an object of the present invention to improve the known method for retaining an optimum amount of displayable information. Now, according to one of its aspects, the invention is characterized in that in said high range, the contrast after said enhancing is a monotonically increasing function of said contrast before said enhancing. As discussed more in detail hereinafter, the resulting enhancement has both objectively and subjectively been satisfying for a broad range of applications.

By itself, earlier work of the present inventor has been described in B. Escalante-Ramirez and J. B. O. S. Martens, Noise Reduction in Computerized Tomography Images by Means of Polynomial Transforms, J. of Visual Image Communication and Image Representation, Vol. 3, (272–285), Sept. 1992, and related Patent Application EP 513 906, corresponding U.S. Ser. No. 07/874,660 to the same assignee as the present application. This reference was directed to relatively attenuating all image variation if its amplitude was considered insignificant. The present invention, on the other hand, is also directed to enhancement, and in particular has realized that contrasts just above the threshold should be enhanced preferentially relative to higher contrasts. Under certain circumstances, the present invention gives results that are functionally equivalent to the Escalante et al reference, by leaving out the contrast enhancement just above the threshold. In that case, the implementation according to the present invention is more efficient than in the reference.

Advantageously, the non-uniform function is monotonically decreasing, in particular, has an asymptote with an asymptotic value for high contrast equal to one. This has been found very satisfying in practice.

Advantageously, the method comprises before said detecting measuring a contrast occurrence spectrum in a second region that is larger than a region of said locally detecting and from said spectrum deriving a boundary between said low range and said high range. Although this means that the method must first assess the larger region before being able to execute the enhancing proper, this provides an automatic setting to the best value.

Advantageously, the method comprises detecting an overall contrast weakness in a third region that is larger than a region of said locally detecting and thereupon at least notionally retrocoupling an averaged image signal of the second region for contrast enhancing at a larger window granularity. Regions of low overall contrast may thus be processed in an overall manner that saves processing effort and thus gives higher speed.

The invention also relates to a device for practising the method, and comprising a first branch for through a deriving means generating from an input signal a window-wise local average signal and a second separate branch having detection means for generating a windowed image variability signal. The said second branch has deriving means for from said variability signal deriving a first control signal having an inverse response to said variability signal and a second control signal having a non-inverse response to said variability signal, a first size-controller of said average signal being controlled by said first control signal. The first branch has first processing means for processing said size controlled average signal through an inverse device of said deriving means. The device has a third branch with a second size-controller wherein said input signal is size controlled through said second control signal and said third branch having second processing means corresponding to said first processing means. The device has adder means for adding output signals of said first and third processing means. This represents a particularly straightforward implementation of the method according to the invention. Various further advantageous aspects of the invention are recited in dependent claims.

BRIEF DESCRIPTION OF THE DRAWINGS

These and other aspects and advantages of the invention will be discussed in detail with respect to preferred embodiments disclosed hereinafter, and in particular with reference to the appended Figures that show respectively.

DESCRIPTION OF PREFERRED EMBODIMENTS

In order to determine the residue amplification factor kap, a strategy is specified for enhancing and/or noise-reducing the image. If the contrast measure c is large, then the signal is clearly visible, so that we can reasonably assume that no enhancement is needed, i.e. kap(c)=1 for large c. If c is small, such as $c<c_t$, then the signal can be assumed constant, and if required the residue signal can be deleted by setting kap(c)=0 for $c<c_t$. This requirement is not satisfied in the Vries reference, wherein kap(p)=mu+kap for $c(p) \leq sig_n^2$. This high amplifying factor in noisy regions limits the usefulness of the reference's method. For $c>c_t$, the signals are judged significant, but must be amplified to become clearly visible. The output contrast measure after amplification is $kap^2(c)*c$. This output contrast must be an increasing function of the input contrast. This condition is not satisfied in the reference, that has an intermediate minimum at $c=sig_n^{2}*(kap/mu)$. This is an unwanted property, because image features with a contrast well above the threshold are depicted as less relevant than the (noisy) image features that are only just above the threshold. For large values of the input contrast c, the output contrast is $[c*mu^2+ 2mu*kap*sig_n^2]$. Hence, even for mu=1, the output range is slightly expanded. Herein, the following class of functions is suggested, together with some approximations thereof, that allow fast processing:

$$kap(c) = \begin{cases} kap_o & \text{if } c \leq c_o \\ \sqrt{1 + \frac{kap_o^2}{c/c_o} \left[ \frac{(kap_o^2 - 1)\beta}{(1 - s_o) \cdot (c/c_o - 1) + (kap_o^2 - 1)\beta} \right]^{\beta}} & \text{if } c \geq c_o \end{cases}$$

Another, more simple realization is as follows:

$$kap(c) = \begin{cases} 0; & c < c_t \\ s + (1-s)\sqrt{\frac{s_v}{c}}; & c_t < c < c_v \\ 1; & c > c_v \end{cases}$$

Herein parameters $c_t$, $c_v$ nd s occur, with $0 \leq s \leq 1$. The performance of this expression is comparable to the more complicated one given above, but the necessary calculations are relatively elementary.

Figure 1:
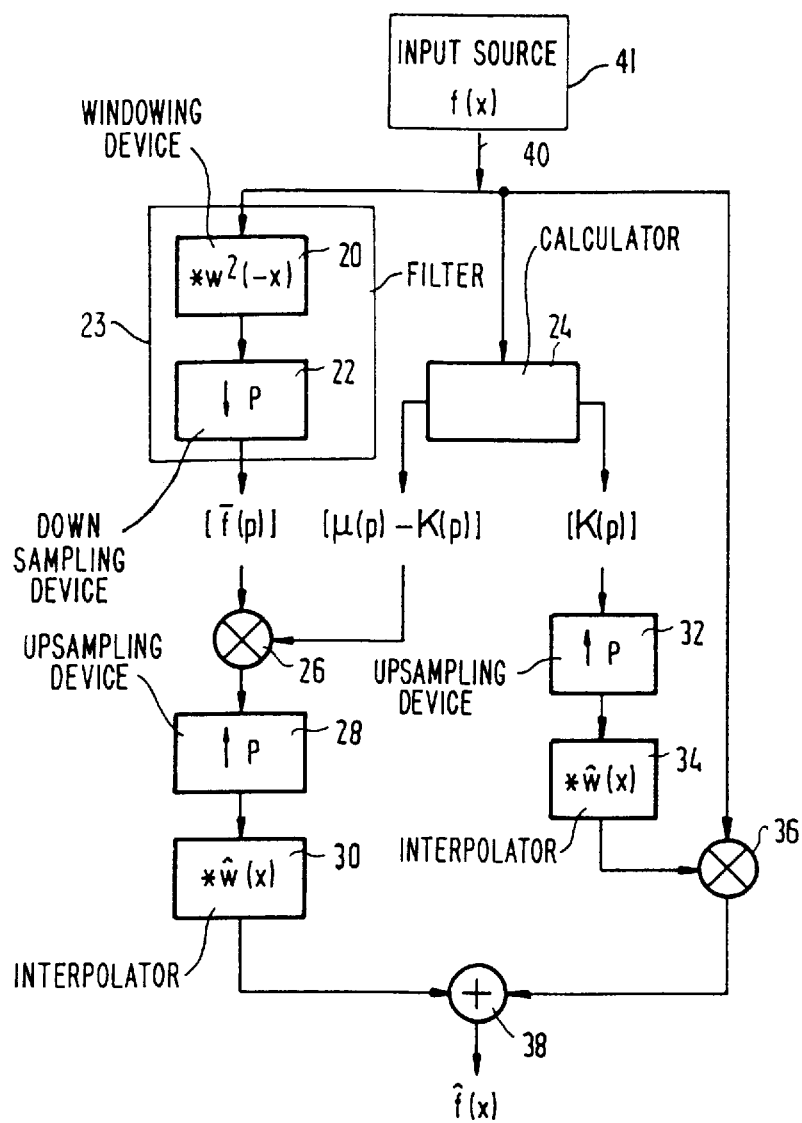
FIG. 1 illustrates a structure of adaptive residue image processing.

FIG. 1 shows a structure of an adaptive residue image processing operation according to the invention. The blockwise structure as shown may be mapped on a so-called video signal processor that consists of multiple processing elements which each may execute one or more elementary processing operations, so that the total hardware may effectively execute the whole processing as shown. By itself, a video signal processor of this kind is known from U.S. Pat. No. 5,103,311. The signal of the image arrives at input 40, as sourced by an appropriate camera, large-scale storage memory, or otherwise 41. The input may be according to various sequential organizations, such as line-by-line. The device then has sufficient memory available to store pixel values or, as the case may be, intermediate processing results, for producing output results of the various stages that represent all input quantities necessary therefore. In certain cases, additional frame buffers could be required. Elements 20, 22 together form a filter 23 for calculating a local average value of the pixel intensities. The dimension of the local environment is according to the structure of the picture, but for a television-like size (order of one million pixels) a square of 25 pixels could be appropriate. This size is not a restriction. Non-square shapes of the environment could be useful. By itself, element 20 may be a device for windowing of the kind that is in wide use for picture processing. Element 22 is a downsampling device for thereby limiting the amount of data to be processed in the subsequent processing stages. Downsampling can be by an integer or non-integer factor. If sufficient processing power is available, downsampling could even be foregone, so that element 20 alone would generate the local average. If downsampling is not done, later interpolating is not necessary.

Thereby, the output signal of block 22 is an array of average values as indicated. Block 24 receives the input values as well and calculates two adaptivity values that are functions of position (p). The first one [mu(p)-kap(p)] is the mean value weighting function, the second one [kap(p)] is the residue weighting function. Element 26 is a multiplier. The set of multiplied values is sent to block 28 that executes upsampling. Finally in block 30 an interpolation is executed, according to expressions that are inverse to the ones effected in block 22, although they may be somewhat different. Likewise in block 32 an upsampling on the results from block 24 is executed, followed by an interpolation in block 34. In element 36 a multiplication between the residue weighting function and the original pixel values is executed. The output signal arrays from elements 30, 36 are added in adder element 38 to produce the upgraded output signal as indicated. Such elements as necessary for correcting timing discrepancies have not been shown. It should be remarked that block pair 28 and 32 can be mutually identical, which is also valid for the block pair 30 and 34.

Just as in the Escalante and Martens reference, supra, the present invention can be used in a pyramidal or hierarchical organization. To that effect, the output signal of block 22 is used for constituting a larger integration area if the output of this block 22 varies sufficiently little over such larger area. For convenience, the necessary detector has not been separately shown; it compares the local variability signal c(p) to a particular threshold. If c(p) is lower than the threshold, the output signal of block 22 is functionally or notionally retrocoupled to input 40 and processed again with a coarser granularity. If the local variability is above the threshold, the setup as shown is used only once, and no retrocoupling is effected. The process of thresholding can be executed several times in succession, so that a pyramidal organization results, with successively coarser granularities and increased window sizes.

The adaptive residue filtering of the foregoing assumes that we can derive the mean-value amplification factor and the residue amplification factor from the input signal. Such factors are functions:

$$mu(p)=mu[fm(p),c(p)]$$

and $$kap(p)=kap[fm(p),c(p)]$$

of the mean signal value fm(p) and some contrast value c(p) that expresses how much the signal locally deviates from its mean value. The mean signal value is defined as:

$$fm(p)=\int w^2(x-p)*f(x)dx.$$

All contrast measures that have been considered can be derived by some kind of quadratic filtering of the input signal. An advantageous choice is as follows:

$$c(p)=\int w^2(x-p)[f(x)-fm(p)]^2 dx$$

which is equal to the weighted energy in the residue signal. A further refinement can be attained by letting the weight factors mu and kap depend on the average value of the function f. For brevity this is not considered further.

Figure 2:
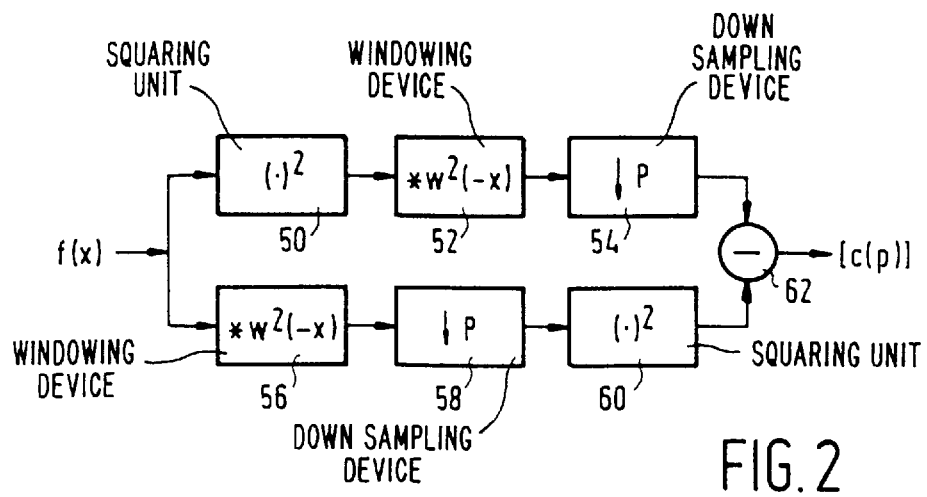
FIG. 2 illustrates a structure for deriving the energy of the residue signal.
Figure 4:
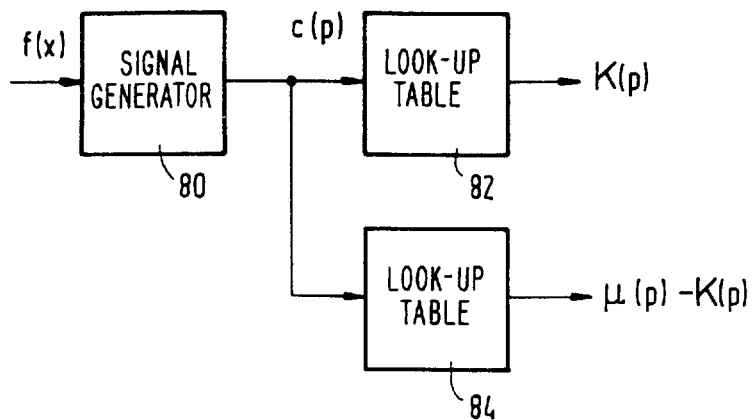
FIG. 4 illustrates generation of enhancing and attenuation factors.

FIG. 2 shows a structure for deriving the total energy of the residue signal according to the above expression for use in the arrangement according to FIG. 1 (cf. also FIG. 4). The blocks in the Figure are again elementary elements of one or more video signal processors and in fact, execute part of the functionality necessary for block 24 in the arrangement of FIG. 1. The input signal f(x) has been shown in FIG. 1. Block 50 successively calculates the square of the pixel values. Blocks 52, 54 functionally correspond to blocks 20, 22, respectively. Likewise, blocks 56, 58 correspond to blocks 20, 22, respectively. Now, the final block 60 executes a squaring of its input values. Block 62 calculates the difference of the two input values received as pertaining to the same positions, which boils down to the difference between the average of the square and the square of the average. If this quantity is large, locally there is much contrast; if this quantity is small, there is little contrast; if zero, the pixels have uniform values. The output signal [c(p)] is used for further processing. The set up requires only one additional filter operation since the mean value, fm(p), is already produced in FIG. 1 according to the above expression. The necessary hardware is in the lower branch of FIG. 2, to wit, only blocks 56 and 58.

All residue signals are not always equally significant. Therefore, a second quadratical energy contrast measure is considered has a directional character and in consequence tunes preferentially for instance to edges in the image. Such contrast measures have the general form $$c(p)=\Sigma_{i=1}^D[\int d_i(x-p)*f(x)dx]^2,$$

wherein $d_i(x)$ is a derivative filter along the i-th dimension of the D-dimensional signal space. By itself, this contrast measure was already used in the Escalante and Martens reference.

Figure 3:
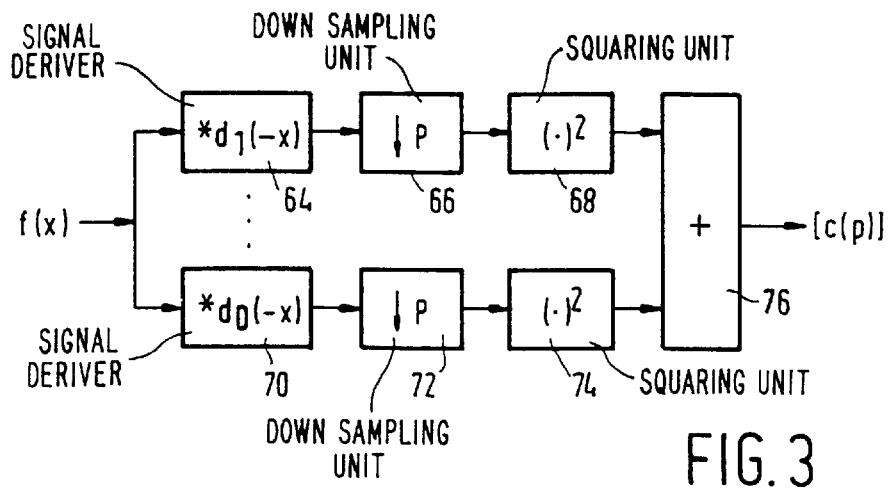
FIG. 3 illustrates a structure for deriving the energy of the signal derivative.

FIG. 3 shows a structure for according to the above deriving of the energy of the signal derivative for use in the arrangement according to FIG. 1. The arrangement consists of one or more parallel branches that each determine the signal derivative in a particular direction 1 ... D (blocks 64, 70) followed by downsampling (blocks 66, 72) and squaring/energy determination (blocks 68, 74). Block 76 represents an overall adder to produce output signal [c(p)].

For determining the value of kap, we herein suggest in particular to use the following class of functions:

$$kap(c) = \begin{cases} kap_o & \text{if } c \leq c_o \\ \sqrt{1 + \frac{kap_o^2}{c/c_o}\left[\frac{(kap_o^2-1)\beta}{(1-s_o)\cdot(c/c_o-1)+(kap_o^2-1)\beta}\right]^\beta} & \text{if } c \geq c_o \end{cases}$$

for the residue amplification factor if $c>=c_t$ and kap(c)=0 otherwise. The residue amplification factor is equal to kap $(c_0)=kap_0$, with $kap_0>1$, at the contrast $c=c_0$. The output contrast, $kap^2(c)*c$ is an increasing function of the contrast c, and has a derivative equal to $s_0$ at $c=c_0$, where $0<=s_0<=1$. The power factor $\beta=0$ controls the asymptotic behaviour of the residue amplification factor. It is advantageously set equal to $\beta=1$ or $\beta=(1-s_0)/(kap_0^2-1)$. The input contrast and the output contrast are equal for large values of c, as can be seen from FIG. 5. The choice $\beta=(1-s_0)/(kap_0^2-1)$ results in the following simplified expression for the residue amplification factor $$kap(c) = \sqrt{1 + (kap_o^2 - 1)\left(\frac{c_o}{c}\right)^\gamma},$$

where $\gamma=\beta+1=(kap_0^2-s_0)/(kap_0^2-1)$. The output contrast is $c+(kap_0^2-1)*c_0*(c_0/c)^\beta$, which has also been shown in FIG. 5. Visual inspection of processed images learns that the influence of the parameter $\beta$ is little, so for convenience the value $\beta=(1-s_0)/(kap_0^2-1)$ is most often adopted. The simplified expression for kap(c) given earlier behaves in similar manner and will not be considered in detail hereinafter.

Instead of specifying absolute values for the contrast $c_0$ and $c_t$, we prefer to specify them as multiples of the expected contrast output for uniform regions, i.e. the expected output is only noise is present. This expected output is $c_n=(1-\alpha_2)*sig_n^2$ if the contrast measure is equal to the energy in the residue signal, and $c_n=lam*D*sig_n^2$ if the contrast measure is equal to the energy in the signal derivative. Herein, the quantity $lam=\int_F d_1^2(x)dx = \ldots lam=\int_F d_D^2(x)dx$, each function d being a directional derivative in direction 1 ... D. For two-dimensional images D=2, and for a sequence of two-dimensional images, D=3. The quantity $\alpha_n$ is calculated according to the expression $\alpha_n=\int_F w^{2n}(x)dx$ with usually taken n=2.

Furthermore, the quantity lam is determined along the following line of thought. Because the derivative filters $d_i(x)$ along the D different dimensions are similar, we have the quadratic form of equation (15) has one non-zero eigenvalue $$\lambda=\int_F d_1^2(x)dx= \ldots =\int_F d_D^2(x)dx$$

of order D. In the case of white input noise with variance $\sigma_n^2$, the first characteristic function of the quadratic form is equal to $$\phi(S) = \frac{1}{(1-sd_n)^M} \cdot \exp\left(\frac{sd_b(p)}{1-sd_n}\right),$$

with M=D/2 and $d_n=2\lambda\sigma_n^2$. The signal response is denoted by $$d_b(p) = \sum_{i=1}^D \left(\int_F d_i(x)b(x)dx\right)^2.$$

Since the first characteristic function is of the same form as in the above case of the energy measure, the analytic expressions in equations (37), (40) and (41) for the PDF apply, with $e_b(p)$ and $e_n$ replaced by $d_b(p)$ and $d_n$ respectively. The expressions for the mean value $$m_c(p)=d_b(p)+\sigma_n^2.\lambda D$$

and variance $$\sigma_c^2(p)=2\lambda\sigma_n^2.[2d_b(p)+\sigma_n^2.\lambda D].$$

of the contrast measure have to be changed accordingly. The peak in the histogram of c occurs, for uniform regions, at $c_0=\sigma_n^2.\lambda.(D-2)$, and hence cannot be used to estimate the noise variance $\sigma_n$ if D=2. If D=2, we can use the peak in the histogram of $\sqrt{c}$, which occurs at $\sqrt{d_{n/2}}=\sigma_n \cdot \sqrt{\lambda}$.

For example, in the specific case of a binomial window $w^2(x)$ or order B, the derivative filter $d_i(x)$ is a separable filter with impulse response $$w_1(j) = \frac{B!}{2^B j!(B-j)!} \cdot \frac{2j-B}{\sqrt{B}}$$

for j=0, ..., B along the i-th dimension, and impulse response $$w_0(j) = \frac{B!}{2^B j!(B-j)!}$$

for j=0, ..., B, along the other dimensions [16]. The non-zero eigenvalue $$\lambda = \sum_{j=0}^{B} w_1^2(j) \cdot \left[\sum_{j=0}^{B} w_0^2(j)\right]^{D-1} = \frac{B}{2B-1} \left[\frac{(2B)!}{(2^B B!)^2}\right]^D$$

The contrast $c_0$ up to which the maximum residue amplification factor of $kap_0$ is applied is set to $c_0=T_0*c_n$, where $T_0$ is usually close to one. Since the threshold contrast $c_t$ distinguishes noisy regions from significant image features, choosing $c_t=T_c*c_n$ proportional to the expected output in noisy regions is a reasonable strategy. Typically, $T_c$ has a value larger than 1.

FIG. 4 shows an arrangement for generating the enhancing and attenuating factors, thereby realizing block 24 in FIG. 1. Block 80 generates signal c(p) and may be formed as the arrangements shown in either of FIGS. 2, 3. Block 82 is a lookup-table device for generating [kap(p)], block 84 a second look-up table device for generating [mu(p)-kap(p)] containing the appropriate translation functions. Herein, kap(p) is the residue weighting function, and [mu(p)-kap(p)] the mean value weighting function. In FIG. 4, these weighting functions are assumed to be independent of the mean value fm(p).

Figure 5:
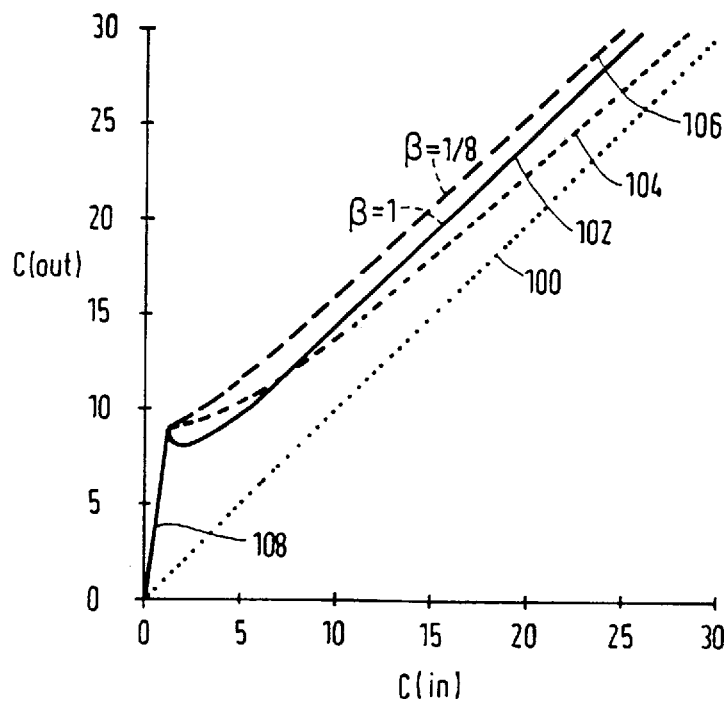
FIG. 5 illustrates various examples of response curves.

FIG. 5 shows various examples of response curves. Along the horizontal axis figures the input contrast, along the vertical axis the output contrast. Straight lines through the origin like 100, 108 amplify each contrast with a uniform factor that by itself does not make the picture any more instructive. Now, curve 102 shows the result obtained by De Vries, supra, for mu=1, kap=2 and var=1. It is clear that the usage of the reference method actually has a negative slope in the output response just above the threshold. The present inventor has found that the slope above this threshold should be monotonic, and moreover, that the response curve should preferably have an asymptote that is the line for unchanged contrast. Curve 104 corresponds to the expression (59), with β=1, c0=1, kap0=3, and s0=0. Curve 106 corresponds to expression (60), with c0=1, $kap_0$=3, and s0=0.

For the response below the threshold, various curve shapes are useful. In the Figure, below the threshold a uniform contrast enhancement has been assumed as represented by a straight line. Another approach is according to the Escalante et al reference, which in that region suppresses all contrast but transmits a uniform level. Generally, it is clear that the choice of the various parameters allows straightforward adaptation to incidental requirements of the actual image.

Figure 6:
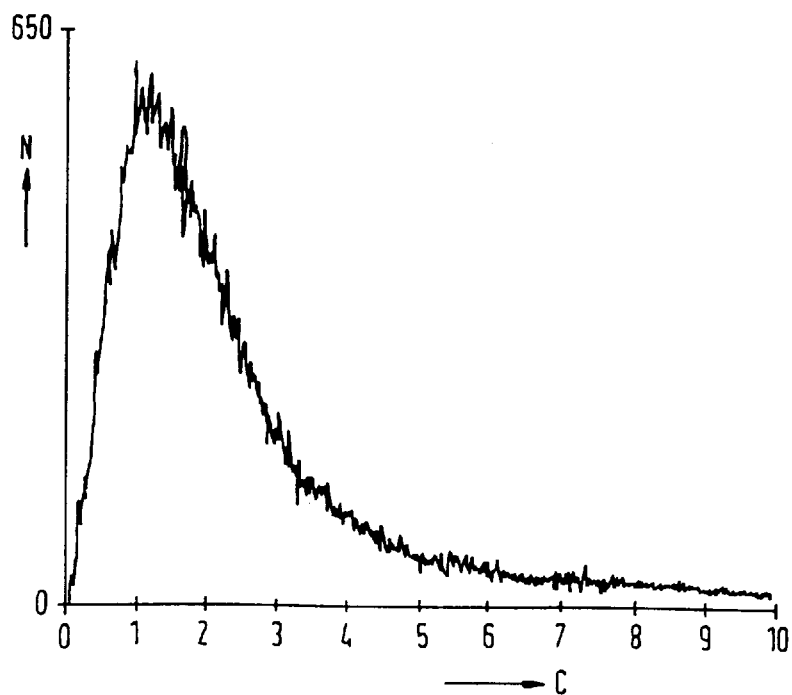
FIG. 6 illustrates a histogram of the contrast measure.

FIG. 6 shows a histogram of the contrast measure, that is the energy in the residue signal of a particular image that was used to design policy and optimum values of parameters. This histogram is used to estimate the noise variance over the image, under the assumption that the image comprises a sufficient amount of uniform regions, so that the mode of the histogram is not shifted by the image structure. The noisy appearance of the histogram necessitates some smoothing to obtain a reliable estimate of the mode. A preferred method is to use uniform windows for such smoothing. In this example, the standard deviation has been estimated as $sig_n$=1.3. It has been found that assuming this value gives very reliable results over a broad range of noise variances.

What is claimed is:

1. A method for contrast-enhancing in a multi-dimensional image, said method comprising the steps of:
   sampling the multi-dimensional image according to a regular array of instants;
   based on said instants, locally detecting a local contrast quantity;
   detecting said quantity as being in one of a low range or a high range;
   when in said high range, locally relatively enhancing said local contrast quantity with an enhancement factor that is a monotonically non-increasing, non-uniform function of said local contrast quantity, such that in said high range, the local contrast quantity after said enhancing, is a monotonically increasing function of said local contrast quantity before said enhancing.

2. A method as claimed in claim 1, wherein said non-uniform function is monotonically decreasing.

3. A method as claimed in claim 1, wherein said non-uniform function has an asymptote with an asymptotic value for high contrast equal to one.

4. A method as claimed in claim 1, wherein said low range, relatively attenuating said local contrast quantity for noise reduction.

5. A method as claimed in claim 1, further comprising the step of before determining said enhancing factor, subsampling (22) said image.

6. A method as claimed in claim 1, further comprising the step of before said detecting, measuring a contrast occurrence spectrum in a second region that is larger than a region of said locally detecting and from said spectrum deriving a boundary between said low range and said high range.

7. A method as claimed in claim 6, further comprising the step of detecting an overall contrast weakness in a third region that is larger than a region of said locally detecting and thereupon at least notionally retrocoupling an averaged image signal of the second region for contrast enhancing at a larger window granularity.

8. A device comprising processing elements configured for executing a method comprising the steps of:
   (i) sampling the multi-dimensional image according to a regular array of instants;
   (ii) based on said instants, locally detecting a local contrast quantity;
   (iii) detecting said quantity as being in one of a low range or a high range;
   (iv) when in said high range, locally relatively enhancing said local contrast quantity with an enhancement factor that is a monotonically non-increasing, non-uniform function of said local contrast quantity, such that in said high range, the local contrast quantity after said enhancing, is a monotonically increasing function of said local contrast quantity before said enhancing,
   said processing elements comprising:
      a first branch for, through a deriving means, generating from an input signal a window-wise local average signal;

a second separate branch having detection means for generating a windowed image variability signal, said second branch having deriving means for, from said variability signal, deriving a first control signal having an inverse response to said variability signal and a second control signal having a non-inverse response to said variability signal, a first size-controller of said average signal being controlled by said first control signal, and said first branch having first processing means for processing said size controlled average signal through an inverse device of said deriving means;

a third branch with a second size-controller wherein said input signal is size controlled through said second control signal and said third branch having second processing means corresponding to said first processing means; and adder means for adding output signals of said first and third processing means.

9. A device as claimed in claim 8, further comprising:

a discrimination device fed by said detection means for discriminating said variability signal with a threshold and outputting either a high signal or a low signal; and routing means for under control of a low signal, at least notionally retrocoupling an output of said deriving means back to an input of said device for executing said method on a larger scale granularity.

\* \* \* \* \*